(12) United States Patent
Sasage et al.

(10) Patent No.: US 9,580,128 B2
(45) Date of Patent: Feb. 28, 2017

(54) HARNESS ROUTING STRUCTURE FOR SADDLED VEHICLE

(71) Applicant: HONDA MOTOR CO., LTD., Minato-Ku, Tokyo (JP)

(72) Inventors: Taiki Sasage, Wako (JP); Kazunori Yoshimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/899,285

(22) PCT Filed: Apr. 9, 2014

(86) PCT No.: PCT/JP2014/060308
§ 371 (c)(1),
(2) Date: Dec. 17, 2015

(87) PCT Pub. No.: WO2014/208177
PCT Pub. Date: Dec. 31, 2014

(65) Prior Publication Data
US 2016/0137249 A1    May 19, 2016

(30) Foreign Application Priority Data

Jun. 28, 2013 (JP) ................................ 2013-137285

(51) Int. Cl.
B62J 35/00 (2006.01)
B62J 37/00 (2006.01)
(Continued)

(52) U.S. Cl.
CPC ................ B62J 35/00 (2013.01); B62J 1/00 (2013.01); B62J 6/18 (2013.01); B62J 17/00 (2013.01);
(Continued)

(58) Field of Classification Search
CPC .............................. B62J 6/19; B62J 2099/004
See application file for complete search history.

(56) References Cited

U.S. PATENT DOCUMENTS 6,907,865 B1* 6/2005 Hanby ................. F02M 37/103
123/509
7,681,920 B2* 3/2010 Iwasaki .................... B62J 35/00
180/219

(Continued)

FOREIGN PATENT DOCUMENTS

JP    2000-219180 A    8/2000
JP    2012-116316 A    6/2012
(Continued)

OTHER PUBLICATIONS

PCT/ISA/210 from PCT/JP2014/060308 and the English translation thereof.
Office Action issued in the corresponding Japanese Patent Application 2015-523901, with a mailing date of Oct. 4, 2016, and the English translation thereof.

Primary Examiner — Kevin Hurley
(74) Attorney, Agent, or Firm — Carrier Blackman & Associates, P.C.; Joseph P. Carrier; William D. Blackman

(57) ABSTRACT

A harness routing structure for a saddled vehicle includes a side body cover section, a center cover, a fuel tank having a fuel filler opening at an upper surface, and a refueling tray configured to be supported by the fuel tank, in the harness routing structure for a saddled vehicle used in the saddled vehicle having a straddling space disposed at an upper side of the center cover and through which a passenger passes his/her legs to ride the vehicle, a main harness extending from a front side of the straddling space to a rear side of the straddling space is routed below the center cover, is passed through a side of the refueling tray, and is routed between the side body cover section and the refueling tray.

9 Claims, 11 Drawing Sheets

(51) Int. Cl.
*B62J 6/18* (2006.01)
*B62J 1/00* (2006.01)
*B62J 17/00* (2006.01)
*B62J 25/00* (2006.01)
*B62J 99/00* (2009.01)
*B62K 21/12* (2006.01)

(52) U.S. Cl.
CPC ............... *B62J 25/00* (2013.01); *B62J 37/00* (2013.01); *B62J 99/00* (2013.01); *B62K 21/12* (2013.01); *B62J 2099/004* (2013.01); *B62K 2202/00* (2013.01)

(56) References Cited

U.S. PATENT DOCUMENTS

| | | | | |
|---|---|---|---|---|
| 8,439,148 | B2 * | 5/2013 | Shiina et al. ............ | B62K 5/01 180/312 |
| 8,839,896 | B2 * | 9/2014 | Oshima et al. .......... | B62J 37/00 180/219 |
| 9,242,599 | B2 * | 1/2016 | Shimizu et al. ........... | B62J 3/00 |

FOREIGN PATENT DOCUMENTS

| | | |
|---|---|---|
| JP | 2012-148659 A | 8/2012 |
| JP | 2013-075587 A | 4/2013 |
| JP | 2013-112194 A | 6/2013 |

\* cited by examiner

HARNESS ROUTING STRUCTURE FOR SADDLED VEHICLE

TECHNICAL FIELD

The present invention relates to a harness routing structure for a saddled vehicle.

Priority is claimed on Japanese Patent Application No. 2013-137285, filed Jun. 28, 2013, the contents of which are incorporated herein by reference.

BACKGROUND ART

In a low floor type motorcycle (a scooter type vehicle) disclosed in Patent Document 1, a fuel pump cover section is installed at an upper surface of a fuel tank disposed under a seat. Further, a clamp configured to fix a harness member is installed at a fuel pump cover section. In the vehicle, the harness member is fixed to a clamp and routed.

In addition, in the related art, the above-mentioned harness member is often routed in a state in which the harness member is supported along a vehicle body frame which has a high rigidity.

PRIOR ART DOCUMENTS

Patent Documents

Patent Document 1: Japanese Unexamined Patent Application, First Publication No. 2012-148659

SUMMARY OF INVENTION

Problems to be Solved by the Invention

As disclosed in Patent Document 1, in the low floor type motorcycle in which a straddling space through which a passenger passes his/her legs is formed in front of the seat, when the harness member extending in a forward and rearward direction of the vehicle is routed inside of a saddle section (a center tunnel section) formed with a vehicle body cover section, in general, the vehicle body frame is made to be extended along an inner wall portion of the vehicle body cover section that constitutes the above-mentioned saddle section disposed under a straddling space, the harness member is routed along the vehicle body frame, and the harness member is installed with a short length.

Here, when the harness member is routed in this way, the saddle section is enlarged by the vehicle body frame or the harness member. For this reason, in order to secure boardability for a passenger, the saddle section needs to become more compact.

In consideration of the above-mentioned circumstances, the present invention is directed to provide a harness routing structure for a saddled vehicle capable of securing boardability while suppressing the height of a straddling space, in the saddled vehicle in which the straddling space is formed.

Means for Solving the Problems

A harness routing structure for a saddled vehicle according to the present invention employs the following configurations to solve the above-mentioned problems.

(1) A harness routing structure for a saddled vehicle according to an aspect of the present invention is used in the saddled vehicle, the harness routing structure for a saddled vehicle including a steering handle supported by a head pipe; a passenger-sitting seat disposed at rear side of the steering handle; a step floor section that is disposed between the steering handle and the seat and disposed under the steering handle and the seat, and that is for a passenger who sits on the seat to place his/her legs thereon; a side body cover section configured to cover a vehicle body side surface; a center cover section extending from the side body cover section in a vehicle width direction; a fuel tank that is disposed in a space surrounded by the side body cover section and the center cover section, and that includes a fuel filler opening at an upper surface thereof; and a refueling tray that is disposed to surround a periphery of the fuel filler opening, and that is configured to be supported by the fuel tank, wherein a straddling space into which the passenger passes his/her legs to ride the vehicle is formed at an upper side of the center cover section and between the steering handle and the seat, and a harness member extending from a front side of the straddling space to a rear side of the straddling space is routed below the center cover section, is passed through a side of the refueling tray, and is routed between the side body cover section and the refueling tray.

(2) In the above-mentioned aspect (1), the harness member may be routed to overlap the refueling tray when seen in plan view.

(3) In the above-mentioned aspect (1) or (2), a canister configured to collect a gas generated in the fuel tank may be disposed in a space formed in upward and downward direction which is generated between the fuel tank and the refueling tray, and a charge hose configured to connect the fuel tank and the canister may be routed so that the charge hose extends from an upper surface of the fuel tank and arrives at the canister while surrounding the fuel filler opening and a periphery of an area of the refueling tray surrounding the fuel filler opening, and is supported by the refueling tray.

(4) In the above-mentioned aspect (3), a fuel lid configured to open and close the fuel filler opening may be installed at the center cover section, and a fuel lid cable configured to manipulate opening/closing of the fuel lid may be the fuel lid cable pass a side of the refueling tray which is an opposite side where the harness member passes among both side portions of the refueling tray, and so that the fuel lid capable to overlaps the charge hose when seen in plan view.

(5) In the above-mentioned aspect (4), the seat may be disposed so as to be capable of opening and closing a lower space of the seat, and a seat lock cable configured to manipulate opening/closing of the seat may be routed at an upper side of the harness member and is supported by the refueling tray.

(6) In the above-mentioned aspect (5), the canister and an induction system of the saddled vehicle may be connected via a purge control valve, a first purge hose and a second purge hose, the purge control valve being supported by a vehicle body frame, the first purge hose being disposed at an upstream side of the purge control valve, the second purge hose being disposed at a downstream side of the purge control valve, the first purge hose may be routed so as to overlap the harness member and the seat lock cable when seen in plan view, the second purge hose may be routed so as to overlap the charge hose and the fuel lid cable when seen in plan view, and the refueling tray may support the first purge hose and the second purge hose.

(7) In the above-mentioned aspect (6), a first storage box may be disposed under the seat, a second storage box overhanging forward from a front section of the first storage box and configured to store a battery may be installed at the first storage box, and the refueling tray and the second storage box may be connected while abutting in forward and rearward directions of the vehicle, and support the second purge hose at a connecting area thereof.

(8) In the above-mentioned aspect (3), in the refueling tray, an opening section configured to make the charge hose to face the center cover section may be formed, and a wall section configured to surround a periphery of the opening section may be formed.

Advantageous Effects of Invention

According to the above-mentioned aspect (1), since the harness member passes through between the side body cover section and the refueling tray, a height of the straddling space can be decreased. Accordingly, boardability can be secured.

According to the above-mentioned aspect (2), as the harness member overlaps the refueling tray when seen in plan view, overhanging of the harness member in a vehicle width direction can be suppressed, and a vehicle width dimension of the straddling space can be suppressed. Accordingly, boardability can be further secured.

According to the above-mentioned aspect (3), as the charge hose passes the periphery of the fuel filler opening and the area of the refueling tray surrounding the fuel filler opening, the side body cover section can be disposed such that overhanging in the vehicle width direction is suppressed. Accordingly, boardability can be further secured.

According to the above-mentioned aspect (4), as the fuel lid cable and the charge hose overlap when seen in plan view, overhanging of the fuel lid cable in the vehicle width direction can be suppressed, and a vehicle width dimension of the straddling space can be suppressed. Accordingly, boardability can be further secured.

According to the above-mentioned aspect (5), as the seat lock cable and the harness member overlap when seen in plan view, overhanging of the seat lock cable in the vehicle width direction can be suppressed, and a vehicle width dimension of the straddling space can be suppressed. Accordingly, boardability can be further secured.

According to the above-mentioned aspect (6), as the first purge hose overlaps the harness member and the seat lock cable when seen in plan view and the second purge hose overlaps the charge hose and the fuel lid cable when seen in plan view, overhanging of the first purge hose and the second purge hose in the vehicle width direction can be suppressed, and a vehicle width dimension of the straddling space can be suppressed. Accordingly, boardability can be further secured.

According to the above-mentioned aspect (7), as the second storage box having rigidity that can storage a battery is connected to the refueling tray, the rigidity of the refueling tray can be increased.

Accordingly, a pipeline or the like supported by the refueling tray can be strongly supported.

According to the above-mentioned aspect (8), as the charge hose faces the center cover section through the opening section, an attachment property of the charge hose can be improved. Accordingly, working efficiency can be improved.

DESCRIPTION OF EMBODIMENTS

Figure 1:
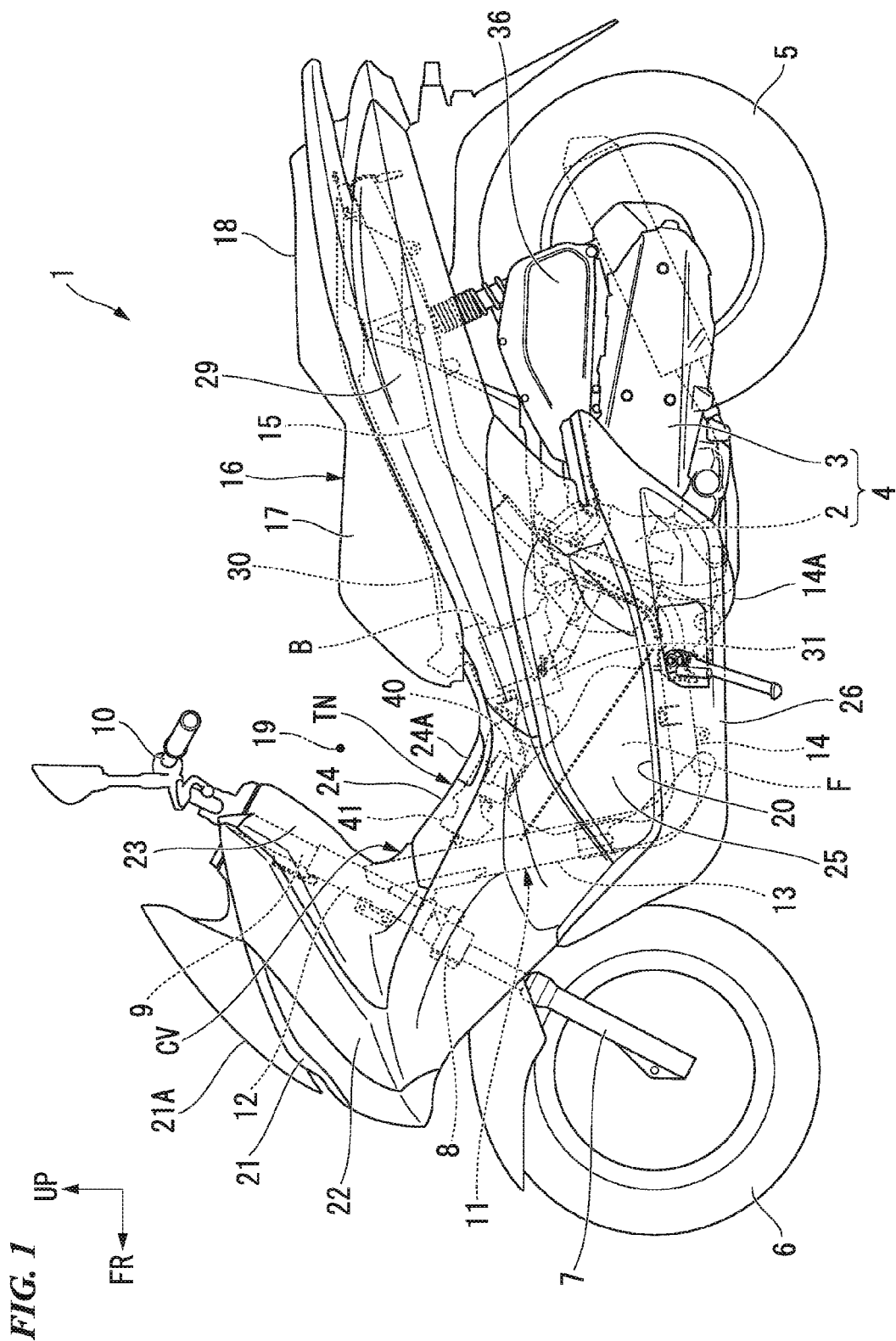
FIG. 1 is a left side view of a motorcycle to which a structure according to an embodiment of the present invention is applied.

Hereinafter, an embodiment of the present invention will be described with reference to the accompanying drawings. Further, in the drawings that are used below, an arrow FR represents a forward side of a vehicle, an arrow UP represents an upper side of the vehicle, and an arrow LH represents a left side of the vehicle.

FIG. 1 shows a scooter type motorcycle 1 to which the embodiment of the present invention is applied. The motorcycle 1 includes a swing unit 4 which has an engine 2 and a power transmission mechanism 3 in an integrated manner. In addition, in the motorcycle 1, a rear wheel 5 is rotatably supported at a rear section of the swing unit 4, and a front wheel 6 is disposed at a forward side of the swing unit 4. The front wheel 6 is rotatably supported at lower sections of a pair of left and right front forks 7 and 7. A bridge 8 is installed over upper sections of the left and right front forks 7 and 7. A steering shaft 9 serving as a steering axle is erected at a center of the bridge 8 in a vehicle width direction.

A steering handle 10 is installed at an upper side of the steering shaft 9, and the steering handle 10 is constituted by a single pipe member extending in a vehicle width direction. A steering system of the motorcycle 1 is mainly constituted by the front wheel 6, the front forks 7 and 7, the steering shaft 9, the steering handle 10, and so on.

The steering shaft 9 is rotatably supported by a head pipe 12. The head pipe 12 is installed at a front end of a vehicle body frame 11 formed by integrating a plurality of frame members through welding or the like. The vehicle body frame 11 of the vehicle includes the head pipe 12, a main frame 13 extending downward from the head pipe 12, a pair of left and right side frames 14 and 14, and a pair of left and right seat frames 15 and 15. The pair of left and right side frames 14 and 14 come in contact with a lower side surface of the main frame 13 to extend rearward, and extend rearward and upward. The pair of left and right seat frames 15 and 15 are connected to upper ends of rear sections of the side frames 14 and 14, and extend rearward and upward. Further, the main frame 13 is slightly inclined with respect to strictly a vertical direction, and extends rearward and downward from the head pipe 12.

The swing unit 4 is supported by rear lower sections of the side frames 14 and 14 via a ring member 14A, and is swingable in upward and downward directions. An air cleaner 36 is installed at an upper section of the swing unit 4. The air cleaner 36 is connected to the engine 2 via a connecting tube, a throttle body and an intake pipe.

A seat 16 on which a passenger sits is disposed at the upper side of the swing unit 4. The seat 16 extends in forward and rearward directions, and a main seat 17 on which a driver sits and a pillion seat 18 on which a fellow passenger sits are integrally formed with each other.

The motorcycle 1 is covered by a vehicle body cover CV constituted by a plurality of exterior covers formed of a resin material. A front cover 21 is disposed at an upper side of the front wheel 6 and a forward side of the head pipe 12. In addition, a pair of left and right front side covers 22 and 22 formed in L shapes and having corners disposed at forward sides when seen in a side view continue to rear edge sections of both side sections of the front cover 21. The front side covers 22 and 22 are formed in a shape in which the L-shaped one sides continue to the rear edge sections of both side sections of the front cover 21 and the other sides extend rearward.

The front cover 21 is formed in a streamlined shape that is tapered toward a forward side of the vehicle when seen in plan view. A notch gradually tapered from a rear side toward a front side along a centerline in a vehicle width direction is formed at an upper section of the front cover 21, and a screen 21A is formed inside the notch. The screen 21A is fixed to an edge section or the like of the notch of the front cover 21, and raised at a rear upper side from a forward side toward a rear side when seen in a side view. The screen 21A is formed such that traveling air from the forward side flows toward a rear upper side by the screen 21A. In addition, the front cover 21 has a front light, and left and right winkers, that are integrally formed with each other.

A space between the left and right rear sections of the front side covers 22 and 22 is covered by an inner cover 23 having an upper side extending in the vehicle width direction. In addition, a lower side of the space between the left and right rear sections of the front side covers 22 and 22 is covered by a center cover 24. A rear wall section of the inner cover 23 extends in the upward and downward directions along the steering shaft 9. A lower end of the rear wall section of the inner cover 23 is disposed at a rear side of a lower end of the head pipe 12. Meanwhile, the center cover 24 continues to the lower end of the rear wall section of the inner cover 23 to extend rearward, and a rear end of the center cover 24 arrives at a lower side of the front end of the seat 16.

A pair of left and right rear side body covers 29 and 29 that continue to the rear section of the center cover 24 and the rear section of the front side cover 22 to extend rearward are formed at rear sides of the center cover 24 and the front side cover 22. The rear side body covers 29 and 29 are disposed below the seat 16 to lengthily extend in the forward and rearward directions of the vehicle, and arrive at an upper side of the rear wheel 5 from the rear section of the center cover 24 and the rear section of the front side cover 22.

Left and right step floors 20 and 20 disposed to be spaced from a center in the vehicle width direction at left and right sides are disposed at a center lower section in the forward and rearward directions of the vehicle. The step floors 20 and 20 have a constant width in the vehicle width direction, and are formed for a passenger to place his/her legs on an upper surface thereof. A pair of left and right lower side body cover sections 25 and 25 that are raised upward and smoothly continue between the rear section of the front side cover 22 and the front sections of the rear side body covers 29 and 29 are integrally formed with the inner end sections in the vehicle width direction of the step floors 20 and 20. The lower side body cover sections 25 and 25 lengthily extend in the forward and rearward direction of the vehicle, and arrive at the lower side of the main seat 17 from the main frame 13.

Meanwhile, under cowl sections 26 and 26 extending toward the center in the vehicle width direction as they go downward are integrally formed with outer end sections in the vehicle width direction of the step floors 20 and 20. Further, in the present embodiment, the lower side body cover sections 25 and 25 and the under cowl sections 26 and 26 are integrally assembled to the step floors 20 and 20 that are formed separately therefrom. However, these are not limited to the embodiment and it is possible for all of the members may be integrally formed with each other.

In the present embodiment, a center tunnel section TN expanding upward from the inner end section in the vehicle width direction of the left and right step floors 20 and 20 and forming a reversed U shape to form a space therein when seen in a cross-sectional view is formed by the center cover 24, the rear sections of the left and right front side covers 22 and 22, the front sections of the left and right rear side body covers 29 and 29 and the front sections of the lower side body cover sections 25 and 25.

A fuel tank F is disposed in the center tunnel section TN. The fuel tank F is supported by the main frame 13 and the side frames 14 and 14. A cylindrical fuel filler opening 40 is formed in an upper surface of the fuel tank F. A fuel lid 24A configured to open the fuel filler opening 40 of the fuel tank F to the outside is openably and closably attached to the center cover 24 by a hinge.

In addition, a straddling space 19 through which a passenger passes his/her legs for riding is formed between the steering handle 10 and the seat 16 at the upper side of the center tunnel section TN (the center cover 24). A driver (a passenger) can ride on the motorcycle 1 as the driver passes his/her legs through the straddling space 19 and sits on the seat 16 (the main seat 17) to place his/her legs on the left and right step floors 20 and 20 installed under the center in the forward and rearward directions of the vehicle body.

In addition, a storage box 30 is formed below the seat 16 between the left and right rear side body covers 29 and 29. The seat 16 is supported by the storage box 30, and can open and close the storage box 30 from a rear side using the front end section of the seat 16 as an axial center. In addition, in the present embodiment, a battery storage section 31 is separately installed at the front section of the storage box 30, and a battery B is stored in the battery storage section 31. The battery storage section 31 extends forward and downward from the front section of the storage box 30.

Figure 2:
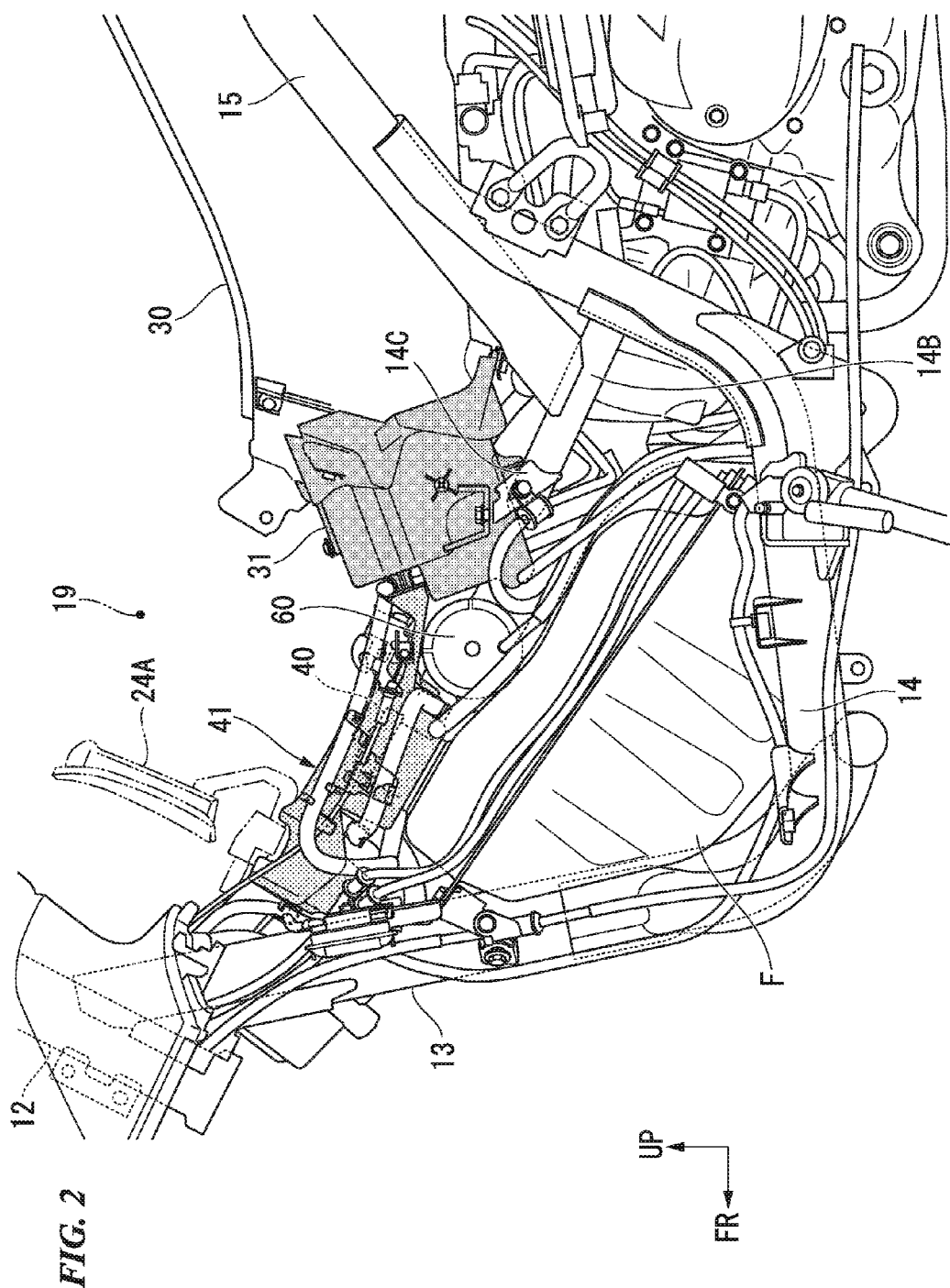
FIG. 2 is a left side view of major parts of the motorcycle.
Figure 3:
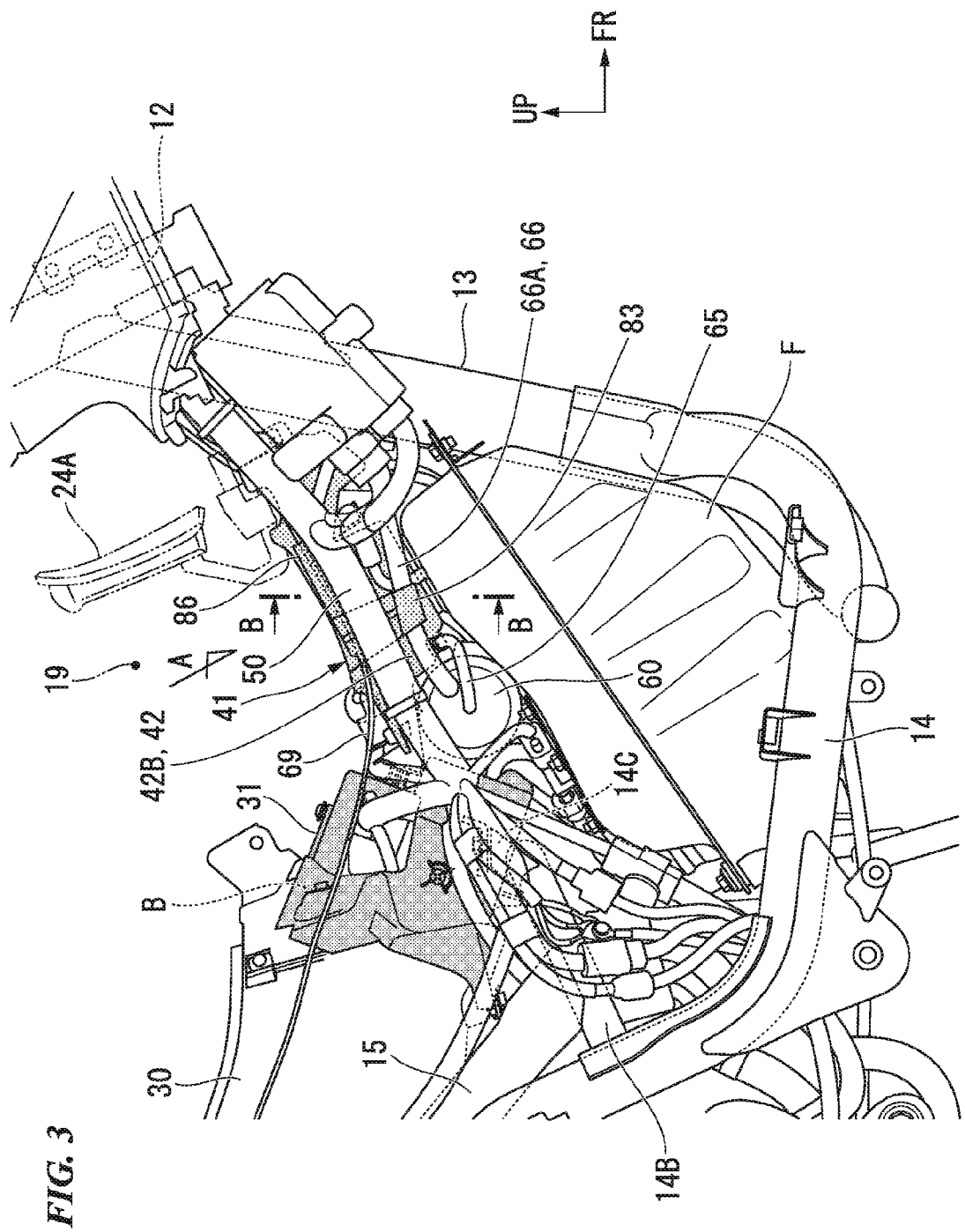
FIG. 3 is a right side view of major parts of the motorcycle.

FIGS. 2 and 3 show a left side view and a right side view of a periphery of the fuel tank F in a state in which an exterior cover that constitutes the center tunnel section TN is removed.

As shown in FIGS. 2 and 3, the fuel tank F extends from a portion extending in the forward and rearward directions of the side frames 14 and 14 toward the main frame 13 forward and upward, and is supported in a state in which it is disposed over the main frame 13 from the side frames 14 and 14. A refueling tray 41 is supported by the fuel tank F and disposed to surround the periphery of the fuel filler opening 40. Further, in FIGS. 2 and 3, dots are added on the refueling tray 41 and the battery storage section 31 for the convenience of description.

In areas extending from areas extending in the forward and rearward directions of the side frames 14 and 14 rearward and upward and connected to the seat frames 15 and 15, a stay section 14B having a U shape when seen in plan view is connected to a position at substantially a center in the forward and rearward directions between the left and right sides. That is, the U-shaped stay section 14B is connected to a position substantially a center of the side frames 14 and 14 in the forward and rearward directions, which is located between a portion of the side frames 14 and 14 extending in the forward and rearward directions and a portion of the side frames 14 and 14 connected to the seat frames 15 and 15, so as to straddle between the left and right sides when seen in plan view. The stay section 14B extends forward and upward from the side frames 14 and 14.

The seat frames 15 and 15 extend further forward from a connecting position between the side frames 14 and 14, and the front end sections of the seat frames 15 and 15 are connected to a position of substantially a center of the stay section 14B in the forward and rearward directions. A pair of left and right auxiliary stay sections 14C and 14C extending upward are formed at the front section of the stay section 14B. The auxiliary stay sections 14C and 14C are fastened to the battery storage section 31 to support the battery storage section 31 from below. Accordingly, the battery storage section 31 is supported by the seat frames 15 and 15 and the side frames 14 and 14 via the stay section 14B. In addition, the storage box 30 is supported by the seat frames 15 and 15.

Figure 4:
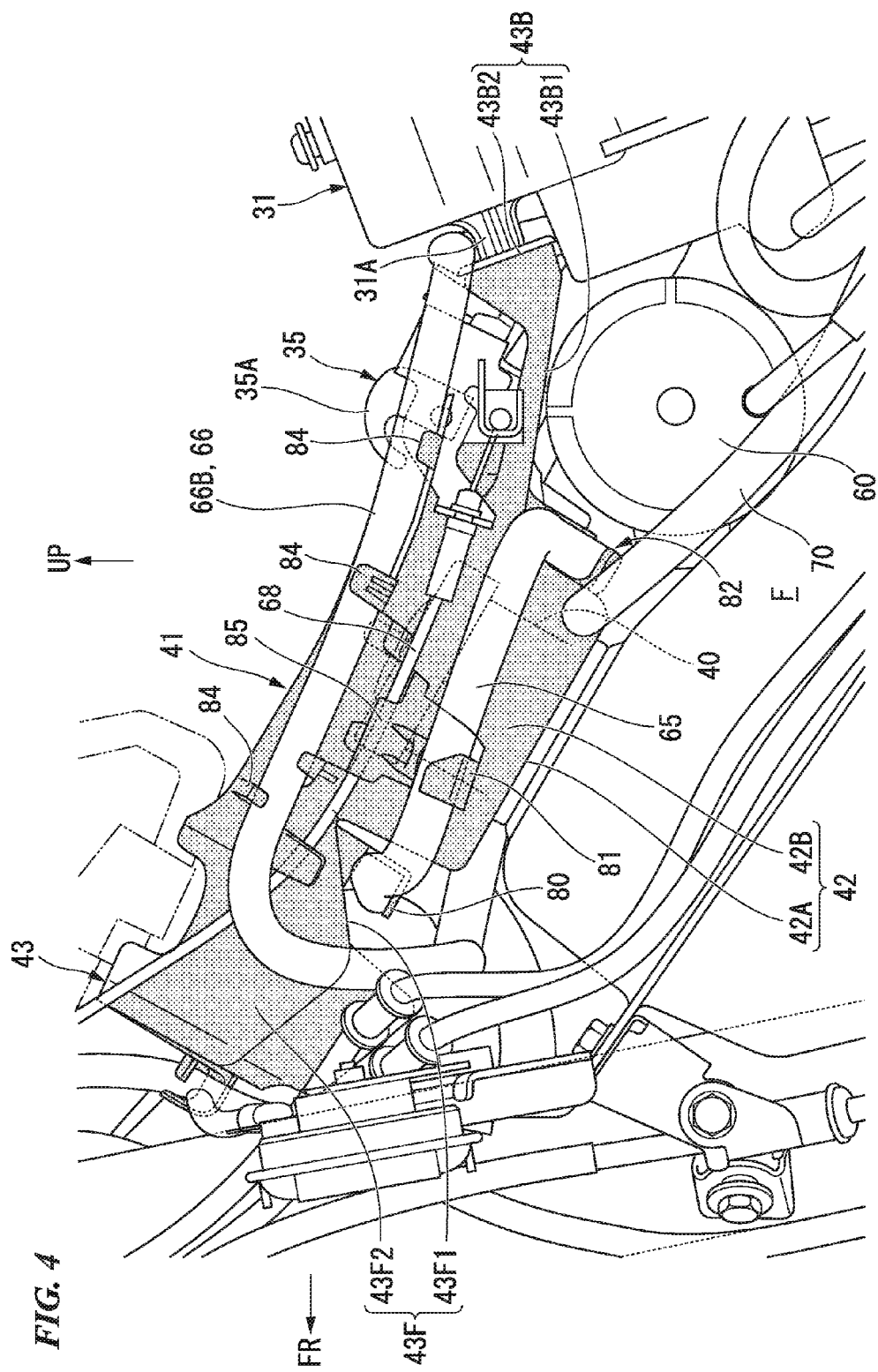
FIG. 4 is an enlarged view of FIG. 2.
Figure 5:
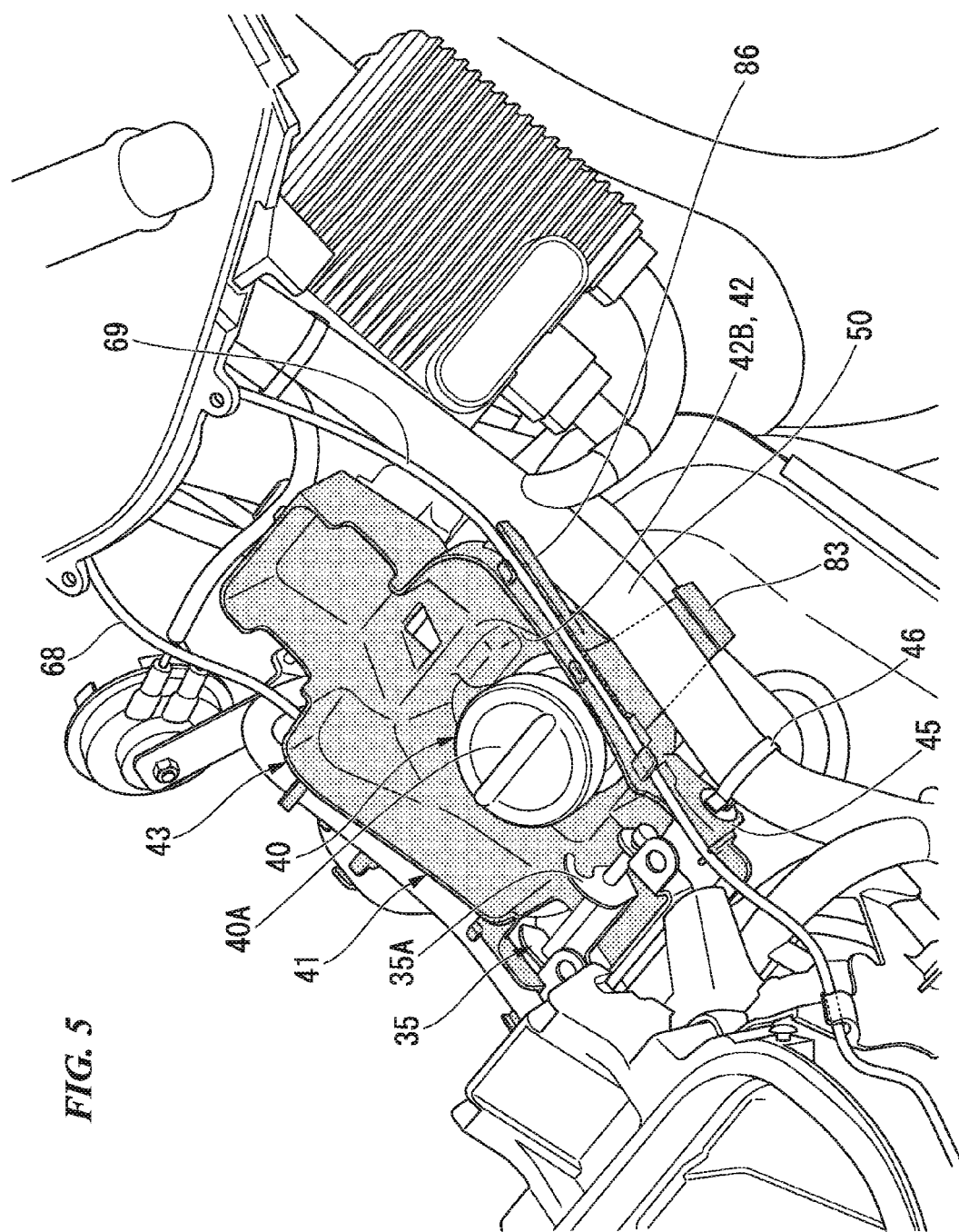
FIG. 5 is a perspective view of a periphery of a refueling tray installed at the motorcycle.

As shown in FIGS. 4 and 5, the refueling tray 41 is formed of a resin material or the like, and integrally includes an enclosure section 42 configured to surround the periphery of the fuel filler opening 40 and an overhanging section 43 overhanging forward, rearward, leftward and rightward from an upper end section of a circumferential wall section 42B of the enclosure section 42. The enclosure section 42 has a bottom section 42A having an opening through which the fuel filler opening 40 is inserted, and the circumferential wall section 42B standing up from an outer circumferential edge of the bottom section 42A.

Figure 6:
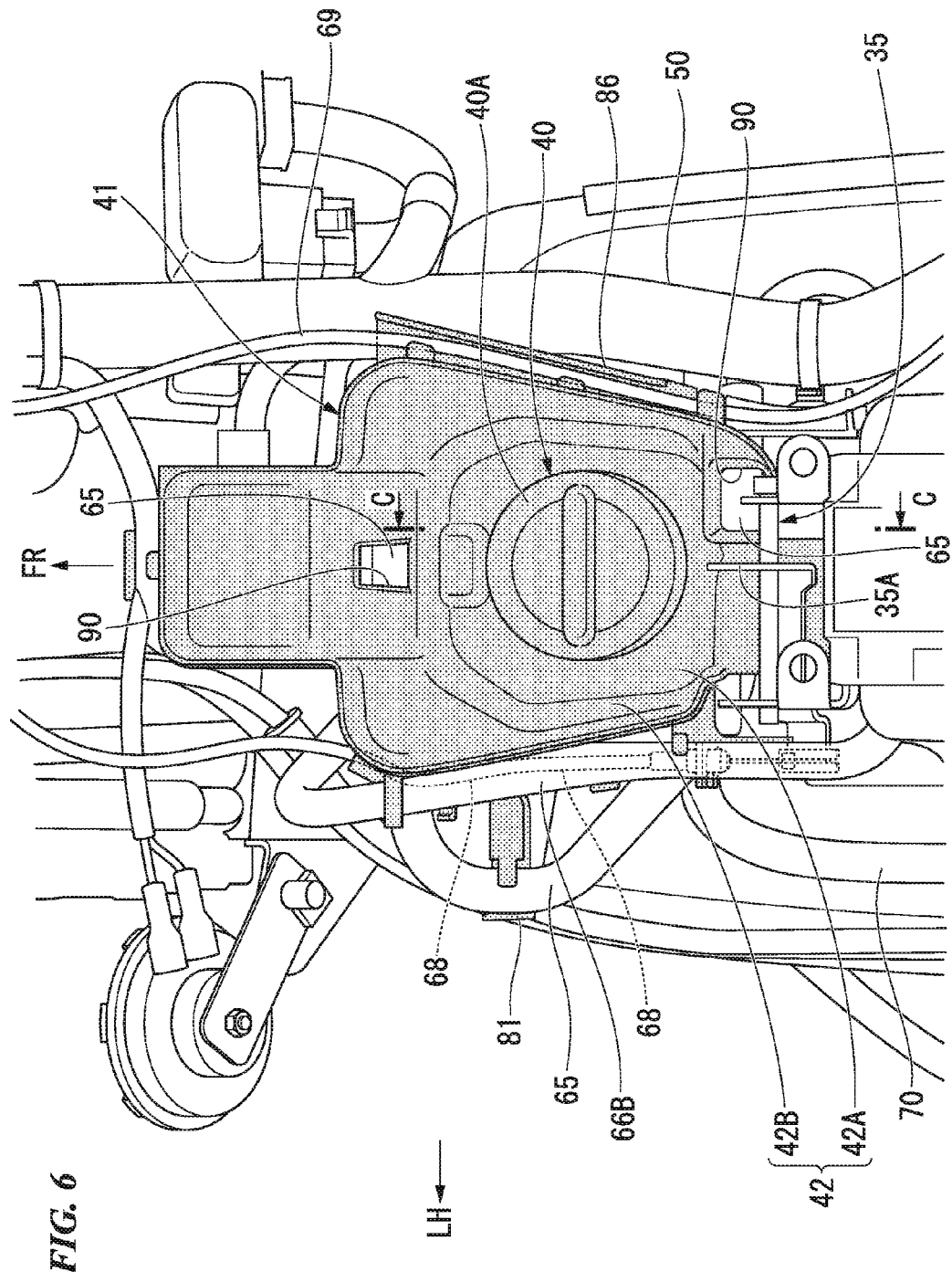
FIG. 6 is a view when seen along an arrow A of FIG. 3.

As shown in FIG. 6, the fuel filler opening 40 inserted through the opening formed in the bottom section 42A of the enclosure section 42 is exposed upward from the bottom section 42A, and is made to opposite to the fuel lid 24A in a closed state. In the drawings, reference numeral 40A represents a cap detachably attached to the fuel filler opening 40.

Figure 9:
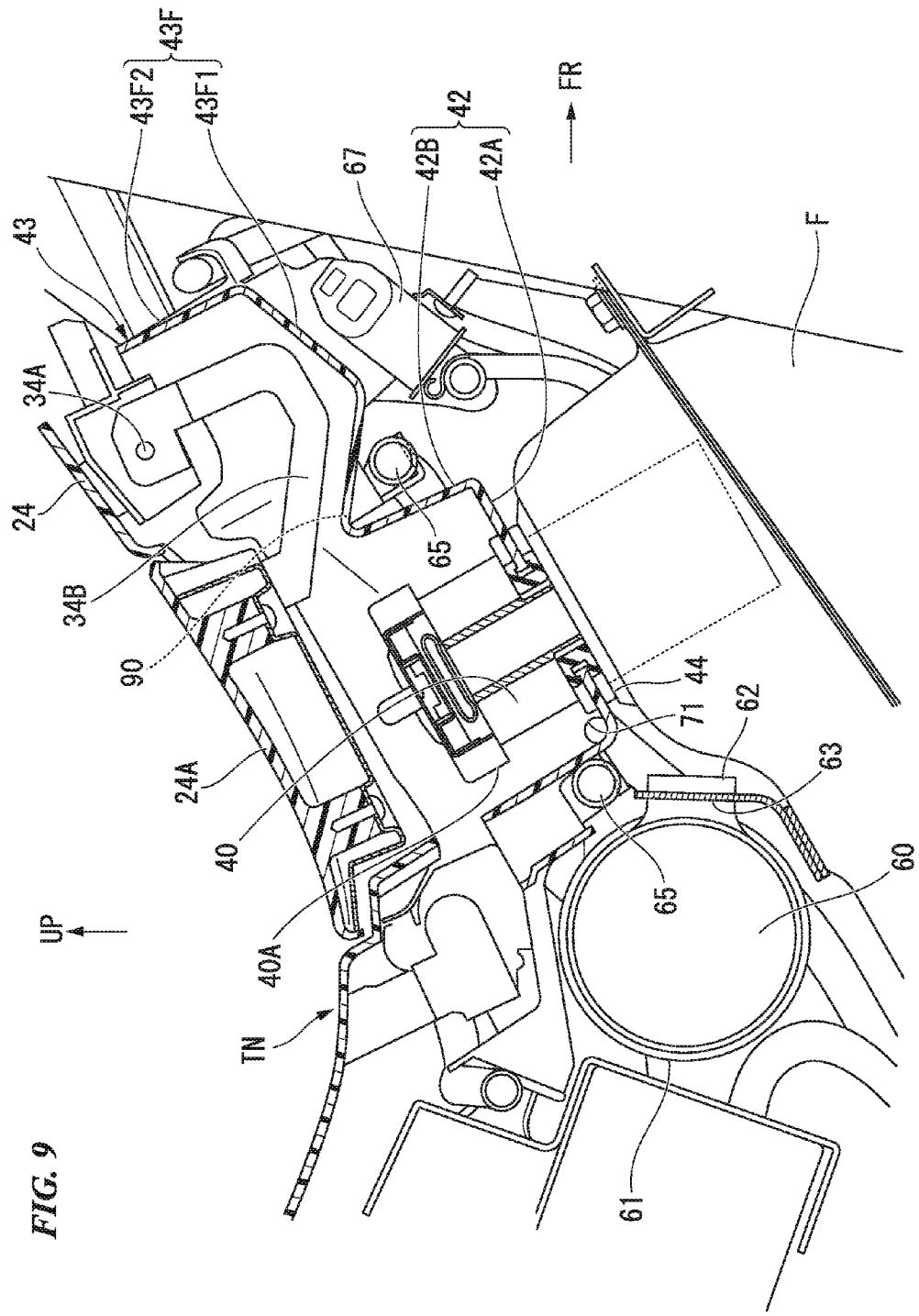
FIG. 9 is a cross-sectional view taken along line C-C of FIG. 6.

FIG. 9 shows a longitudinal cross-section of the fuel filler opening 40. As shown in FIG. 9, an annular grommet 44 is fitted onto a base portion of an area of the fuel filler opening 40 protruding upward from the fuel tank F. The grommet 44 abuts the upper surface of the fuel tank F. The refueling tray 41 water-tightly connects the inner circumferential edge section of the opening formed in the bottom section 42A of the enclosure section 42 to the outer circumferential surface of the fuel filler opening 40 by fitting the inner circumferential edge section of the opening formed in the bottom section 42A of the enclosure section 42 into the fitting groove extending in the circumferential direction formed in the outer circumferential surface of the grommet 44. In addition, the refueling tray 41 is supported by the fuel tank F via the grommet 44 from below.

The fuel filler opening 40 protrudes rearward and upward from the upper surface of the fuel tank F. The refueling tray 41 is supported by the fuel tank F such that front and back surfaces of the bottom section 42A are formed in a direction perpendicular to the axial direction (the protruding direction) of the fuel filler opening 40.

Figure 10:
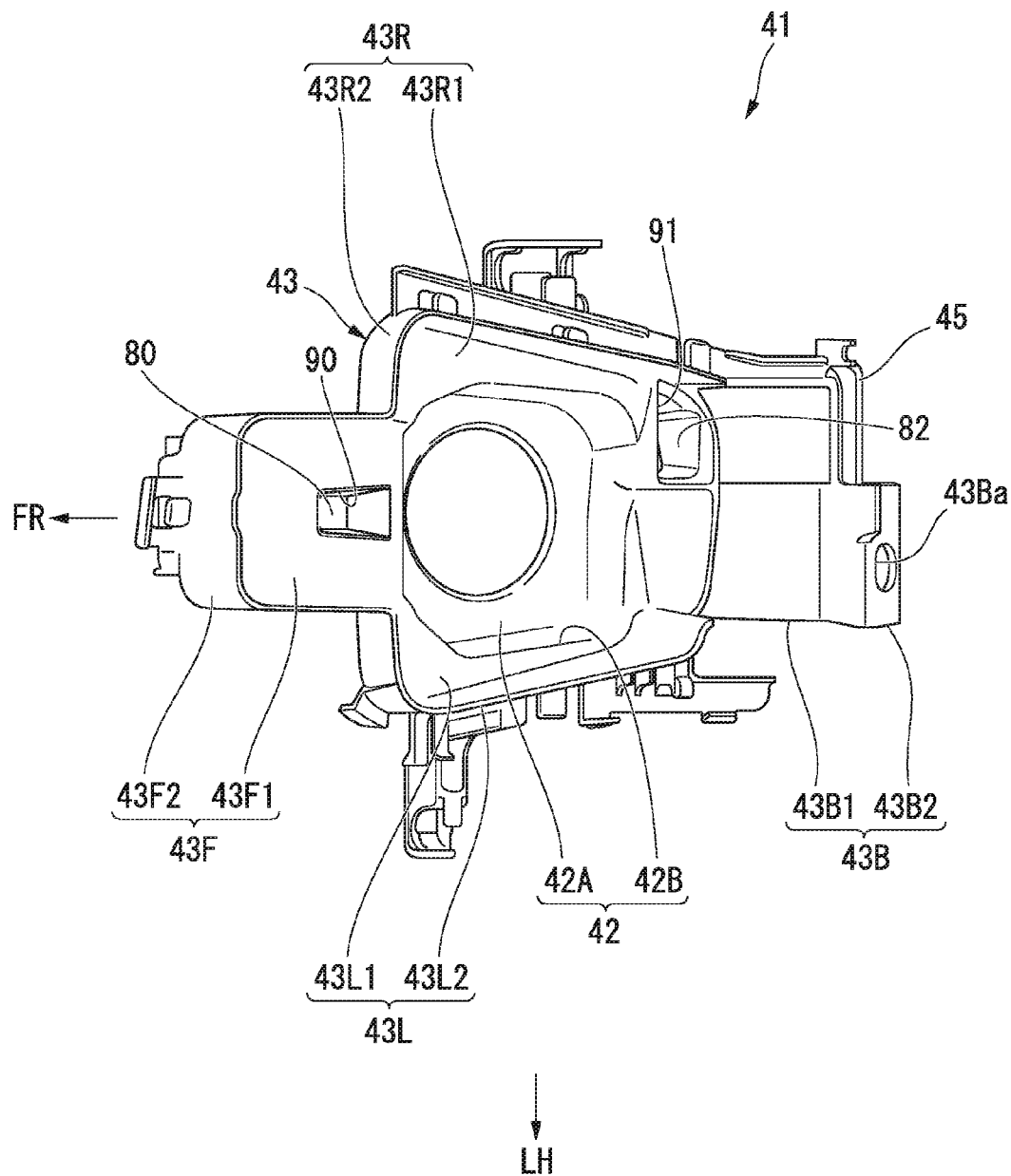
FIG. 10 is a plan view of the refueling tray.
Figure 11:
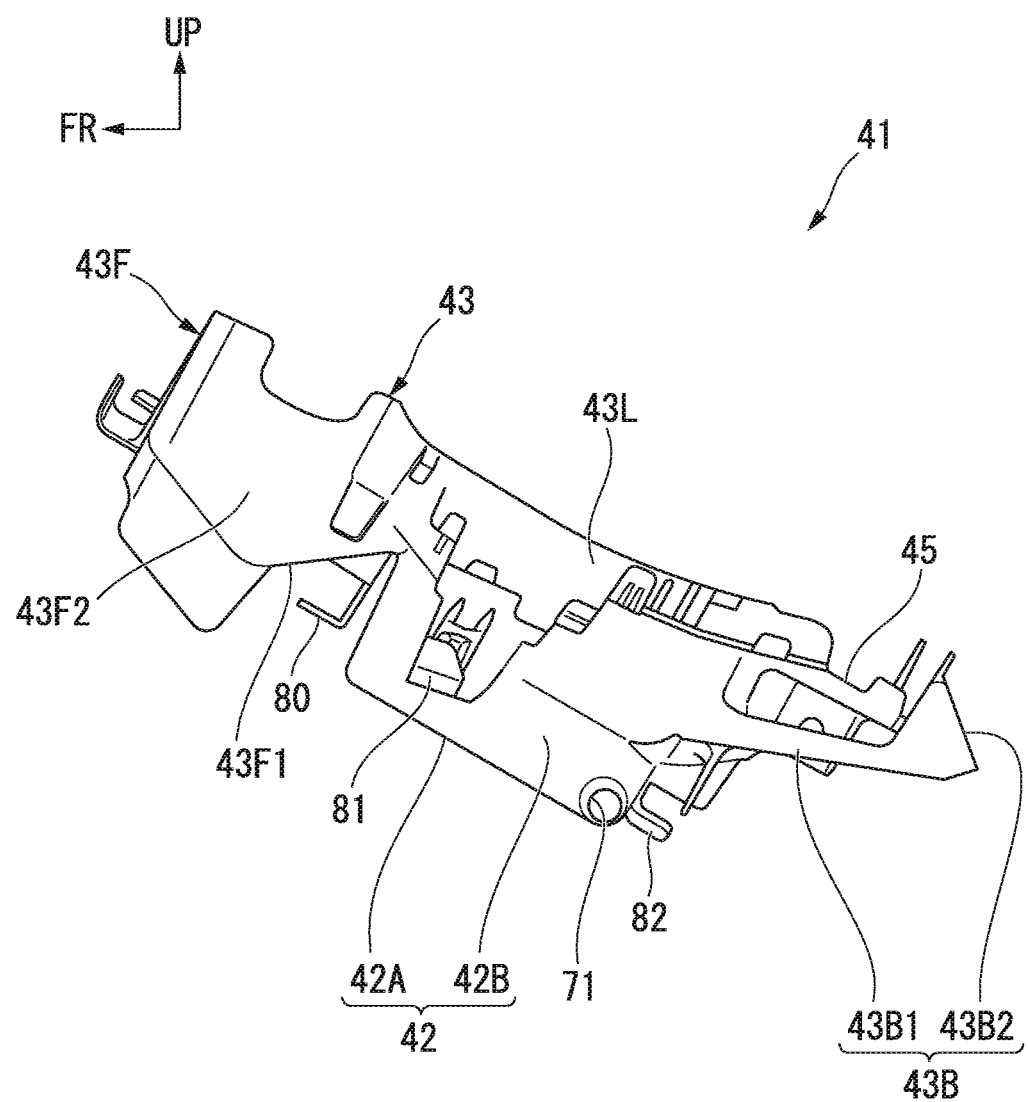
FIG. 11 is a left side view of the refueling tray.

FIG. 10 shows a plan view of the refueling tray 41, and FIG. 11 shows a left side view of the refueling tray 41. A structure of the refueling tray 41 will be described below. In the present embodiment, the bottom section 42A of the enclosure section 42 is formed in a rectangular shape, and the circumferential wall section 42B is formed in a shape in which each of left, right, front and rear wall sections continue in a rectangular shape when seen in a cross-sectional view. The overhanging section 43 has a left overhanging section 43L overhanging leftward from an upper end section of a left side section of the circumferential wall section 42B, a right overhanging section 43R overhanging rightward from an upper end section of a right side section of the circumferential wall section 42B, a front overhanging section 43F overhanging forward from an upper end section of a front side section of the circumferential wall section 42B, and a rear overhanging section 43B overhanging rearward from a rear side section of the circumferential wall section 42B.

The left overhanging section 43L has a left bottom plate section 43L1 overhanging leftward from an upper end section of a left side section of the circumferential wall section 42B to extend in the forward and rearward directions, and a vertical wall section 43L2 standing up from an outer circumferential edge of the left bottom plate section 43L1.

The right overhanging section 43R has a right bottom plate section 43R1 overhanging rightward from an upper end section of a right side section of the circumferential wall section 42B to extend in the frontward and rearward directions, and a vertical wall section 43R2 standing up from an outer circumferential edge of the left bottom plate section 43R1.

The front overhanging section 43F has a bottom plate section 43F1 overhanging forward and downward from an upper end section of a front side section of the circumferential wall section 42B and then extending forward and upward to form a curved shape, and a vertical wall section 43F2 standing up from an outer circumferential edge of the bottom plate section 43F1. FIG. 9 shows a shaft section 34A installed at the center cover 24 and extending in leftward and rightward directions, and a hook-shaped arm section 34B extending from the shaft section 34A and connected to the fuel lid 24A. The front overhanging section 43F forms a storage space configured to accommodate the arm section 34B when the fuel lid 24A is in a closed state.

As shown in FIG. 10, the vertical wall section 43L2 of the left overhanging section 43L extends from a rear side toward a front side and then curves rightward, and the vertical wall section 43R2 of the right overhanging section 43R extends from a rear side toward a front side and then curves leftward.

The vertical wall section 43F2 of the front overhanging section 43F is formed in a C shape (substantially a U shape) that opens rearward. One end section of both of the C-shaped (substantially U-shaped) end sections is integrally connected to the end section of the curved area at the front side of the vertical wall section 43L2, and the other end section of both of the C-shaped (substantially U-shaped) end sections is integrally connected to the end section of the curved area at the front side of the vertical wall section 43R2.

Meanwhile, as shown in FIGS. 4 and 11, the rear overhanging section 43B has an extension section 43B1 extending rearward from a position of substantially a center in the upward and downward directions in the rear side section of the circumferential wall section 42B, and a connecting plate section 43B2 formed at a rear end of the extension section 43B1 and directed toward the battery storage section 31.

A fitting hole 43Ba is formed in the connecting plate section 43B2. A fitting shaft section 31A extending forward and downward from the front section of the battery storage section 31 is fitted into the fitting hole 43Ba. Accordingly, in the present embodiment, the refueling tray 41 is connected to and supported by the battery storage section 31.

In addition, as shown in FIG. 4 and so on, a lid lock mechanism unit 35 configured to rotatably support a striker 35A that holds a closed state of the fuel lid 24A is supported at an upper side of the extension section 43B1. The lid lock mechanism unit 35 holds the closed state of the fuel lid 24A by locking the striker 35A to a latch of the fuel lid 24A side.

Further, as shown in FIG. 10, an L-shaped bridge section 45 formed between the rear section of the extension section 43B1 and a right corner of the circumferential wall section 42B has one end connected to the rear section of the extension section 43B 1 and the other end connected to the right corner of the circumferential wall section 42B.

As shown in FIGS. 2 to 7, in the present embodiment, a plurality of harnesses, pipelines, cables, and so on, configured to connect electric equipment systems are routed around the fuel filler opening 40 and the refueling tray 41. A plurality of mooring sections such as clamps, hooks, or the like, configured to support the above-mentioned harnesses or the like are formed at the refueling tray 41.

Hereinafter, a routing structure around the refueling tray 41 such as the harness or the like will be described.

First, the structure will be described with reference to FIG. 3. In FIG. 3, reference numeral 50 represents a main harness crossing the space while passing under the center cover 24 from a space (a vehicle front section space) surrounded by the front cover 21, the front side cover 22 and the inner cover 23 disposed in front of the straddling space 19 to a space (a vehicle rear section space) surrounded by the rear side body covers 29 and 29 disposed behind the straddling space 19. The main harness 50 is configured to bind a plurality of harnesses or the like configured to supply electric power from the battery B stored in the battery storage section 31 to electric parts disposed at the vehicle front section space side, the vehicle rear section space side, and therebetween, and has a relatively large diameter.

The main harness 50 extends rearward and downward from the head pipe 12 side toward a right side of a lower section of the battery storage section 31, and then extends toward the vehicle rear section. In the present embodiment, as shown in FIGS. 3, 5 and 6, the main harness 50 passes through a side portion (a right portion) of the circumferential wall section 42B of the enclosure section 42 in the refueling tray 41, and is routed between the lower side body cover section 25 and the refueling tray 41.

Figure 7:
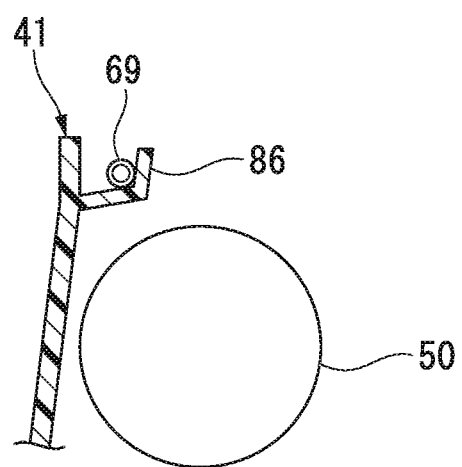
FIG. 7 is a cross-sectional view taken along line B-B of FIG. 3.

In addition, FIG. 7 shows a cross-section taken along line B-B of FIG. 3. As is apparent from FIG. 7, in the present embodiment, the main harness 50 is routed to overlap the refueling tray 41 when seen in plan view. That is, the main harness 50 is disposed at substantially the same height as the refueling tray 41 in the upward and downward directions of the vehicle.

As shown in FIG. 5, an annular clip 46 is fixed to the bridge section 45 of the refueling tray 41. The main harness 50 is wound on and hooked to the clip 46 and supported while positioned at a position of the side portion of the circumferential wall section 42B of the enclosure section 42.

Further, while not shown, the main harness 50 is supported by the battery storage section 31 and the storage box 30 at the vehicle rear section side from substantially a center of the vehicle, and routed between the battery storage section 31 and the storage box 30, and the rear side body cover 29. Accordingly, in the motorcycle 1, since the main harness 50 is supported by the battery storage section 31 serving as a battery case having high rigidity, the main harness 50 can be strongly supported. In addition, since the rear side body cover 29 of a lower periphery of the seat 16 is disposed not to overhang in the vehicle width direction, appearance characteristics can also be improved.

Next, as shown in FIGS. 3 and 4, in the present embodiment, a canister 60 configured to collect a gas (evaporated fuel) generated in the fuel tank F is disposed in a space in the upward and downward directions generated between the upper surface of the fuel tank F and the rear overhanging section 43B in the refueling tray 41.

As shown in FIG. 9, the canister 60 is formed in a columnar shape, and an annular holding body 61 formed of an elastic material is fitted onto an outer circumferential surface thereof. A fixing section 62 protruding from the outer circumferential surface is formed at the holding body 61. A through-hole formed in a slit shape and passing in a direction perpendicular to the radial direction of the holding body 61 is formed in the fixing section 62.

The canister 60 allows a holding claw body 63, which is fixed to the upper surface of the fuel tank F and standing upward, to pass through the through-hole of the fixing section 62 in order to position the canister 60. Accordingly, the canister 60 is supported while being lifted from the fuel tank F in a state in which an axis of the canister 60 is disposed in the leftward and rightward directions.

Figure 8:
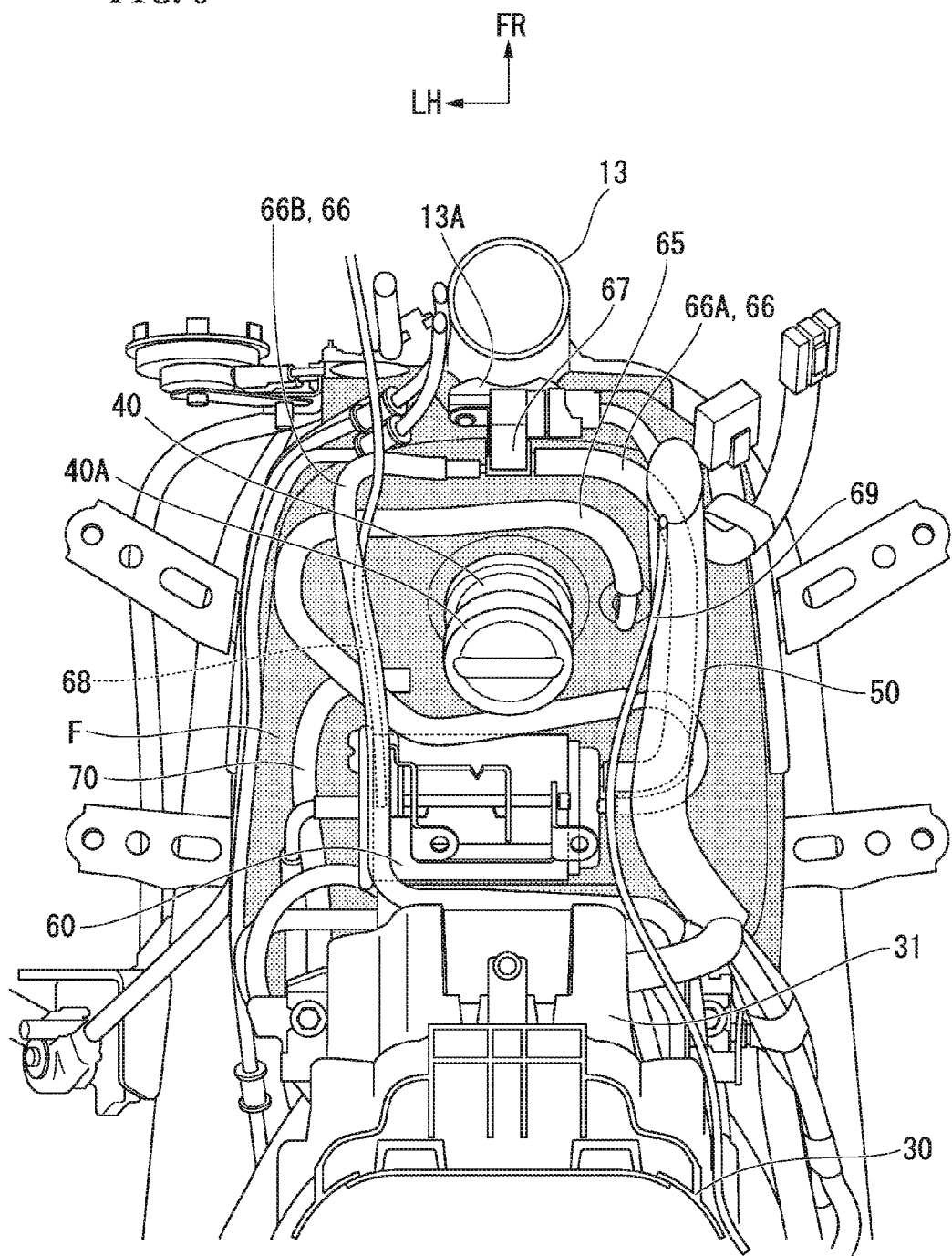
FIG. 8 is a plan view of a periphery of a fuel tank installed at the motorcycle, in a state in which the refueling tray is removed.

As shown in FIGS. 3 and 8, a charge hose 65 in communication with the canister 60 and the inside of the fuel tank F is formed between the canister 60 and the fuel tank F.

In addition, a purge hose 66 in communication with the canister 60 and an induction system of the motorcycle 1 is formed between the canister 60 and the induction system. In the present embodiment, the purge hose 66 is connected to the air cleaner 36 in the induction system. However, the purge hose 66 may be connected to any one of the intake pipe, the throttle body and the connecting tube in the induction system.

The purge hose 66 has a first purge hose 66A and a second purge hose 66B. One end of the first purge hose 66A is connected to the canister 60, and the other end is connected to one end of the second purge hose 66B via a purge control valve 67. The other end of the second purge hose 66B is connected to the air cleaner 36.

The charge hose 65 and the purge hose 66 will be described. One end of the charge hose 65 is connected to a position of a right side of the fuel filler opening 40 in the upper surface of the fuel tank F, passes through the forward side of the fuel filler opening 40 from the fuel tank F, is curved at a rear side, passes through a rear side of the fuel filler opening 40, and then is curved to extend further leftward to be connected to an end surface directed toward a right side of the canister 60.

That is, as shown also in FIG. 4, the charge hose 65 extends from the upper surface of the fuel tank F, and surrounds the peripheries of the fuel filler opening 40 and the enclosure section 42 serving as an area surrounding the fuel filler opening 40 in the refueling tray 41 to be routed to reach the canister 60. In such routing, a path of the charge hose 65 can be lengthily secured, and a gas (evaporated fuel) in the fuel tank F can be efficiently condensed. Accordingly, a collection ability of the canister 60 can be improved.

Further, in the present embodiment, as shown in FIG. 8, the charge hose 65 is disposed to be packed in (the upper surface of) the fuel tank F. For this reason, the charge hose 65 does not overhang in the vehicle width direction, and the vehicle can be miniaturized.

In addition, as shown in FIGS. 4 and 11, an L-shaped front hook section 80 extending downward is integrally formed with the bottom plate section 43F1 of the front overhanging section 43F in the refueling tray 41. The front hook section 80 is disposed at a position spaced apart forward from the enclosure section 42.

In addition, an L-shaped left hook section 81 is integrally formed with the left sidewall section of the enclosure section 42 in the refueling tray 41. In addition, an L-shaped hook section and a rear hook section 82 spaced apart from the hook section and including a plate section opposite thereto in the forward and rearward directions are integrally formed at the rear wall section of the enclosure section 42 in the refueling tray 41.

The charge hose 65 is placed on the front hook section 80, the left hook section 81 and the rear hook section 82 and supported by the hook sections from below.

Returning to FIG. 8, the first purge hose 66A has one end connected to an end surface of the canister 60 directed rightward and extending forward from the canister 60, and the other end connected to the purge control valve 67. The purge control valve 67 is supported by the main frame 13 via a bracket 13A and disposed at substantially a center in the vehicle width direction. In addition, one end of the second purge hose 66B is connected to the purge control valve 67 to extend rearward and curved to pass through a rear side of the canister 60, and further extends rearward to be connected to the air cleaner 36.

The purge control valve 67 is opened when an inner pressure of the first purge hose 66A is a predetermined value or more. When the purge control valve 67 is opened, a gas adsorbed to the canister 60 is supplied into the induction system via the first purge hose 66A and the second purge hose 66B. That is, in a downward direction of the gas from the canister 60 to the induction system, the first purge hose 66A is disposed at an upstream side of the purge control valve 67, and the second purge hose 66B is disposed at a downstream side of the purge control valve 67.

As shown in FIGS. 3 and 5, an L-shaped right hook section 83 is integrally formed with a right sidewall section of the enclosure section 42 in the refueling tray 41. In addition, as shown in FIG. 4, a plurality of left upper hook sections 84 are integrally formed with the left sidewall section at a position higher than the left hook section 81 of the left sidewall section of the enclosure section 42 in the refueling tray 41.

The first purge hose 66A is placed on the right hook section 83 and supported by the right hook section 83 from below. In addition, the second purge hose 66B is placed on the plurality of left upper hook sections 84 and supported by the left upper hook sections 84.

Further, the second purge hose 66B is placed on the upper surface of the fitting shaft section 31A extending forward and downward from the front section of the battery storage section 31 at the area passing through the rear side of the canister 60, and supported also by the fitting shaft section 31A from below.

In addition, in the present embodiment, a fuel lid cable 68 configured to rotatably manipulate the striker 35A is connected to the lid lock mechanism unit 35 supported by the extension section 43B1 in the rear overhanging section 43B of the refueling tray 41. The fuel lid cable 68 is routed to pass through the left side opposite to the side through which the main harness 50 passes, in both sides of the refueling tray 41. As shown in FIG. 8, the fuel lid cable 68 is routed to overlap the charge hose 65 when seen in plan view.

In addition, as shown in FIG. 4, a left intermediate hook section 85 is integrally formed between the left hook section 81 and the left upper hook sections 84 of the left sidewall section of the enclosure section 42 in the refueling tray 41. Then, the fuel lid cable 68 is supported by the left intermediate hook section 85.

In addition, as shown in FIGS. 3, 5 and 6, in the right portion of the refueling tray 41, a seat lock cable 69 configured to manipulate opening/closing of the seat 16 is routed at the upper side of the main harness 50. The seat lock cable 69 is supported by a support plate section 86 overhanging rightward from the vertical wall section 43R2 of the right overhanging section 43R in the refueling tray 41 from below. The support plate section 86 is lengthily formed in an L-shaped cross-section in the forward and rearward directions of the vehicle.

Since the seat lock cable 69 is lighter than the main harness 50 and disposed at the upper side of the main harness 50 to overlap the main harness 50 when seen in plan view, the motorcycle 1 can be designed to have a low center of gravity.

In addition, in the present embodiment, a plurality of locking sections configured to support a pipeline or the like are formed at the refueling tray 41. According to the above-mentioned configuration, since the number of parts configured to supply the pipeline or the like can be reduced and rigidity of the refueling tray 41 can be increased, the pipeline or the like can be strongly supported.

In addition, as shown in FIG. 8, in the present embodiment, when seen in plan view, the first purge hose 66A overlaps the seat lock cable 69 at a lower side thereof while overlapping the main harness 50 at a lower side thereof. In addition, the second purge hose 66B overlaps the charge hose 65 and the fuel lid cable 68 at an upper side thereof when seen in plan view.

In addition, as shown in FIG. 10, in the present embodiment, an opening section 90 is formed in the bottom plate section 43F1 of the front overhanging section 43F in the refueling tray 41, and the above-mentioned front hook section 80 extends downward from the rear edge section in the circumferential edge section of the opening section 90. Here, as shown in FIG. 6, the charge hose 65 supported by the front hook section 80 is formed to face the center cover 24 through the opening section 90. As shown in FIG. 9, the front sidewall section of the enclosure section 42 is disposed behind the opening section 90 in the periphery of the opening section 90, the vertical wall section 43F2 of the front overhanging section 43F is disposed at left, right and front sides, and the periphery of the opening section 90 is surrounded by the plurality of wall sections from front, rear, left and right sides.

The opening section 90 is installed to facilitate a routing operation of the charge hose 65. As the plurality of wall sections are formed at the periphery of the opening section 90, the liquid remaining in the refueling tray 41 can be prevented from flowing through the opening section 90, and the liquid can appropriately flow through a drain hose 70 connected to the refueling tray 41. As shown in FIG. 4, the drain hose 70 is connected to a drain hole 71 (see FIGS. 9 and 10) formed at a position at a rear lower side of the left sidewall section of the circumferential wall section 42B of the enclosure section 42, and extends downward.

Further, as shown in FIG. 10, in the present embodiment, an upper side of the rear wall section of the enclosure section 42 in the refueling tray 41 is curved upward, and an opening section 91 is formed in a curved area of the upper side. As shown in FIG. 6, the opening section 91 is formed to face the charge hose 65 supported by the rear hook section 82 toward the center cover 24. The opening section 91 improves an attachment property of the charge hose 65.

In the motorcycle 1 to which the structure according to the embodiment described as above is applied, since the main harness 50 passes between the rear section of the front side cover 22, the lower side body cover section 25 or the rear side body cover 29 that serves as a side body cover section and the refueling tray 41, a height of the straddling space 19 can be lowered. Accordingly, boardability can be secured. In addition, the weight of the motorcycle 1 can be reduced by a structure in which the main harness 50 is supported by the refueling tray 41 without installing the frame member extending to be inclined to a lower space of the center cover 24 under the straddling space 19.

In addition, in the motorcycle 1, as the main harness 50 overlaps the refueling tray 41 when seen in plan view, overhanging in the vehicle width direction of the main harness 50 can be suppressed, and a vehicle width dimension of the straddling space 19 can be suppressed.

In addition, in the motorcycle 1, as the charge hose 65 passes the fuel filler opening 40 and the periphery of the enclosure section 42 of the refueling tray 41, the lower side body cover section 25 can be disposed to suppress overhanging in the vehicle width direction.

Further, in the motorcycle 1, as the fuel lid cable 68 and the charge hose 65 overlap when seen in plan view, the overhanging of the fuel lid cable 68 in the vehicle width direction can be suppressed, and the vehicle width dimension of the straddling space can be suppressed.

In addition, in the motorcycle 1, as the seat lock cable 69 and the main harness 50 overlap when seen in plan view, the overhanging of the seat lock cable 69 in the vehicle width direction can be suppressed, and the vehicle width dimension of the straddling space can be suppressed.

Furthermore, in the motorcycle 1, as the first purge hose 66A overlaps the main harness 50 and the seat lock cable 69 when seen in plan view and the second purge hose 66B overlaps the charge hose 65 and the fuel lid cable 68 when seen in plan view, the overhanging of the first purge hose 66A and the second purge hose 66B in the vehicle width direction can be suppressed and the vehicle width dimension of the straddling space can be suppressed.

As a result, in the motorcycle 1, boardability can be further secured.

In addition, in the motorcycle 1, as the battery storage section 31 having sufficient rigidity to storage the battery B and the refueling tray 41 are connected by the fitting shaft section 31A, rigidity of the refueling tray 41 can be increased. For this reason, the pipeline or the like supported by the refueling tray 41 can be strongly supported.

In addition, in the motorcycle 1, as the charge hose 65 faces the center cover 24 through the opening section 90, the attachment property of the charge hose 65 can be improved and the working efficiency can be improved.

Hereinabove, while an embodiment of the present invention has been described, the present invention is not limited to the above-mentioned embodiment but may be appropriately varied without departing from the spirit of the present invention.

REFERENCE SIGNS LIST

1 motorcycle (saddled vehicle), 10 steering handle, 12 head pipe, 16 seat, 19 straddling space, 20 step floor (step floor section), 22 front side cover (side body cover section), 24 center cover (center cover section), 24A fuel lid, 25 lower side body cover section (side body cover section), 29 rear side body cover (side body cover section), 30 storage box (first storage box), 31 battery storage section (second storage box), 40 fuel filler opening, 41 refueling tray, 50 main harness (harness member), 60 canister, 65 charge hose, 66A first purge hose, 66B second purge hose, 67 purge control valve, 68 fuel lid cable, 69 seat lock cable, 90 opening section, B battery, F fuel tank.

The invention claimed is:

1. A harness routing structure for a saddled vehicle used in the saddled vehicle, the harness routing structure for a saddled vehicle comprising:
    a steering handle supported by a head pipe;
    a passenger-sitting seat disposed at rear side of the steering handle;
    a step floor section that is disposed between the steering handle and the seat and disposed under the steering handle and the seat, and that is for a passenger who sits on the seat to place his/her legs thereon;
    a side body cover section configured to cover a vehicle body side surface;
    a center cover section extending from the side body cover section in a vehicle width direction;
    a fuel tank that is disposed in a space surrounded by the side body cover section and the center cover section, and that includes a fuel filler opening at an upper surface thereof; and
    a refueling tray that is disposed to surround a periphery of the fuel filler opening, and that is configured to be supported by the fuel tank,
    wherein a straddling space into which the passenger passes his/her legs to ride the vehicle is formed at an upper side of the center cover section and between the steering handle and the seat, and
    a harness member extending from a front side of the straddling space to a rear side of the straddling space is routed below the center cover section, is passed through a side of the refueling tray, and is routed between the side body cover section and the refueling tray.

2. The harness routing structure for a saddled vehicle according to claim 1, wherein the harness member is routed to overlap the refueling tray when seen in plan view.

3. The harness routing structure for a saddled vehicle according to claim 1, wherein a canister configured to collect a gas generated in the fuel tank is disposed in a space formed in upward and downward direction which is generated between the fuel tank and the refueling tray, and
    a charge hose configured to connect the fuel tank and the canister is routed so that the charge hose extends from an upper surface of the fuel tank and arrives at the canister while surrounding the fuel filler opening and a periphery of an area of the refueling tray surrounding the fuel filler opening, and is supported by the refueling tray.

4. The harness routing structure for a saddled vehicle according to claim 3, wherein a fuel lid configured to openably and closably close the fuel filler opening is installed at the center cover section, and
    a fuel lid cable configured to manipulate opening/closing of the fuel lid is routed so that the fuel lid cable passes a side of the refueling tray which is an opposite side where the harness member passes among both side portions of the refueling tray, and so that the fuel lid cable overlaps the charge hose when seen in plan view.

5. The harness routing structure for a saddled vehicle according to claim 4, wherein the seat is disposed so as to be capable of opening and closing a lower space of the seat, and a seat lock cable configured to manipulate opening/ closing of the seat is routed at an upper side of the harness member and is supported by the refueling tray.

6. The harness routing structure for a saddled vehicle according to claim 5, wherein the canister and an induction system of the saddled vehicle are connected via a purge control valve, a first purge hose and a second purge hose, the purge control valve being supported by a vehicle body frame, the first purge hose being disposed at an upstream side of the purge control valve, the second purge hose being disposed at a downstream side of the purge control valve, the first purge hose is routed so as to overlap the harness member and the seat lock cable when seen in plan view, the second purge hose is routed so as to overlap the charge hose and the fuel lid cable when seen in plan view, and the refueling tray supports the first purge hose and the second purge hose.

7. The harness routing structure for a saddled vehicle according to claim 6, wherein a first storage box is disposed below the seat, a second storage box overhanging forward from a front section of the first storage box and configured to store a battery is installed at the first storage box, and the refueling tray and the second storage box are connected while abutting in forward and rearward directions of the vehicle, and support the second purge hose at a connecting area thereof.

8. The harness routing structure for a saddled vehicle according to claim 3, wherein, in the refueling tray, an opening section configured to make the charge hose to face the center cover section is formed, and a wall section configured to surround a periphery of the opening section is formed.

9. The harness routing structure for a saddled vehicle according to claim 2, wherein a canister configured to collect a gas generated in the fuel tank is disposed in a space formed in upward and downward direction which is generated between the fuel tank and the refueling tray, and a charge hose configured to connect the fuel tank and the canister is routed so that the charge hose extends from an upper surface of the fuel tank and arrives at the canister while surrounding the fuel filler opening and a periphery of an area of the refueling tray surrounding the fuel filler opening, and is supported by the refueling tray.

* * * * *